United States Patent
Weissenberger et al.

[11] Patent Number: 5,803,329
[45] Date of Patent: Sep. 8, 1998

[54] CARRIER RACK FOR A TWO-WHEELED VEHICLE, IN PARTICULAR FOR A BICYCLE

[75] Inventors: Heinz Weissenberger, Klettgau-Griessen, Germany; Sylvain Thevoz, Payerne, Switzerland

[73] Assignee: Gebruder Pletscher AG, Marthalen, Switzerland

[21] Appl. No.: 585,103

[22] Filed: Jan. 16, 1996

[30] Foreign Application Priority Data

Apr. 24, 1995 [EP] European Pat. Off. ............... 95106094

[51] Int. Cl.[6] .......................................................... B62J 7/04
[52] U.S. Cl. ........................... 224/450; 224/448; 224/452; 224/427; 224/422
[58] Field of Search ..................... 224/450, 448, 224/452, 454, 455, 456, 443, 427, 422, 425; 280/288.4

[56] References Cited

U.S. PATENT DOCUMENTS

| | | |
|---|---|---|
| D. 249,676 | 9/1978 | Pletscher . |
| D. 303,781 | 10/1989 | Pletscher . |
| 553,614 | 1/1896 | Handloser ................................ 224/448 |
| 2,704,626 | 3/1955 | Meier, Jr. ................................ 224/448 |

FOREIGN PATENT DOCUMENTS

| | | | |
|---|---|---|---|
| 459550 | 11/1913 | France | ..................................... 224/39 |
| 1534010 | 6/1967 | France | ..................................... 224/39 |
| U-94 11 316 | 10/1994 | Germany . | |
| A-90 036 | 7/1921 | Switzerland . | |
| 100839 | 8/1923 | Switzerland | .............................. 224/39 |
| 19914 | 6/1908 | United Kingdom | ..................... 224/39 |

*Primary Examiner*—Linda J. Sholl
*Attorney, Agent, or Firm*—Oliff & Berridge, PLC

[57] ABSTRACT

A carrier rack for a two-wheeled vehicle, in particular for a bicycle, has a carrying body and struts supporting the same. A lower fastening element is mounted on the struts, and an upper fastening element is mounted on the carrying body for fastening the carrier rack on the vehicle. The lower fastening element can be fitted onto a retaining part, fastenable on the vehicle. It can be brought into operative connection with the retaining part, and released again therefrom, by turning the carrier rack with respect to the retaining part. The upper fastening element is a clamping-type closure which can be manually clamped on, and released again from, a tube of the two-wheeled vehicle. Consequently, the carrier rack can, quickly and easily, be fitted on, and removed from, a two-wheeled vehicle such as a bicycle or mountain bike.

16 Claims, 4 Drawing Sheets

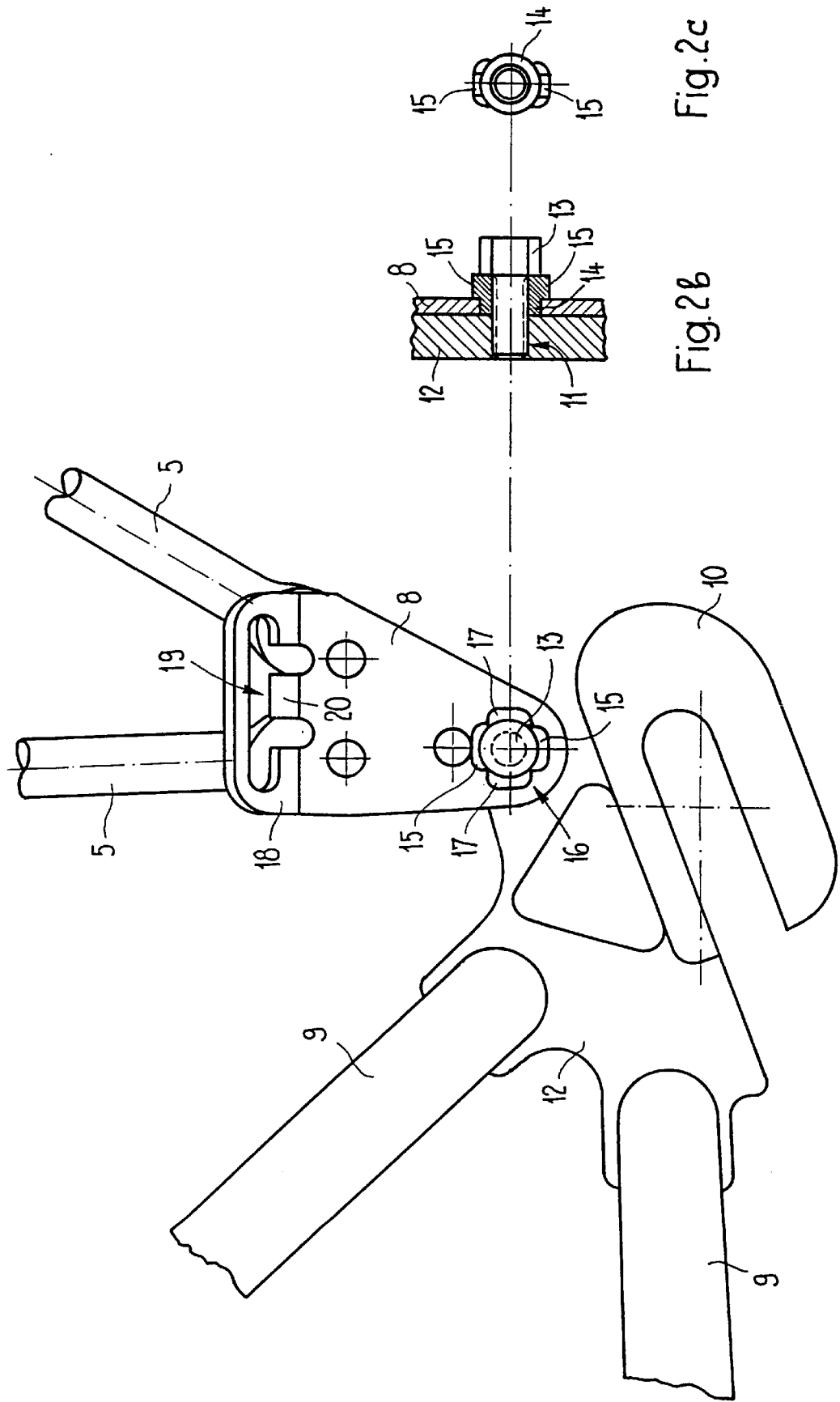

5,803,329

CARRIER RACK FOR A TWO-WHEELED VEHICLE, IN PARTICULAR FOR A BICYCLE

BACKGROUND OF THE INVENTION

The invention relates to a carrier rack for a two-wheeled vehicle, in particular for a bicycle.

Carrier racks of this type are known, for example, as bicycle luggage racks. They include a carrying body, and struts which support the carrying body and are provided on both sides of the carrying body. A fastening plate is screwed or riveted on the ends of the struts and is fastened on the vehicle frame by means of a screw. Usually two projecting, tubular or sheet-like securing means are provided at the top of the carrying body. The securing means are likewise fastened on the vehicle frame by means of screws. By virtue of the type of connection, these luggage racks are destined exclusively for permanent connection to a bicycle.

Recently, due to greater requirements on bicycles for leisure purposes and sport, new types of bicycles have come onto the market. These are generally referred to by the term "mountain bike." Such bicycles usually do not have a luggage rack fixed thereon, since luggage racks can hinder sporting activities in a number of ways. Any items of luggage must be carried along in a rucksack on the cyclist's back. Relatively heavy, bulky or angular items of luggage generally cannot be transported by such a bicycle.

SUMMARY OF THE INVENTION

The object of the invention is to provide a carrier rack or luggage rack of the above-mentioned type, which permits rapid mounting on, and demounting from, a rackless two-wheeled vehicle, in particular a bicycle.

This object is achieved by a carrier rack comprising a carrying body, struts supporting the carrying body, a lower fastening element mounted on the struts and an upper fastening element mounted on the carrying body for fastening the carrier rack on the vehicle. The lower fastening element is fitted onto a retaining part, which is fastenable on the vehicle, and is brought into operative connection with the retaining part, and released therefrom, by turning the carrier rack with respect to the retaining part. The upper fastening element is a clamping-type closure which can be manually clamped on, and released from, a tube of the two-wheeled vehicle.

The invention makes possible rapid, tool-free fastening in the region of the wheel suspension by interengagement of mating fastening elements and securing of the same by turning of the fastening elements relative to one another. Auxiliary means or tools for fastening, which have to be fixedly connected either to the carrier rack or luggage rack or to the vehicle itself in order that they do not get lost, are not required. Further, since the carrier rack can simply be fitted on, and turned, in the region of the wheel suspension to effect fastening to the vehicle there, a manually operable clamping-type closure is provided for fastening of the rack in the region of the saddle, i.e. on the saddle tube or in its immediate vicinity on the vehicle frame.

The carrier rack according to the invention can be fastened on a two-wheeled vehicle such as a bicycle, and removed therefrom, reliably and rapidly with few manipulations. Of course, the carrier rack according to the invention is not just suitable for so-called mountain bikes, but may also be fitted on racers. Furthermore, the carrier rack is not necessarily provided as a conventional luggage rack, but may likewise support a container or an integrated child's seat.

BRIEF DESCRIPTION OF THE DRAWINGS

Further advantages of the invention will be apparent from the following description, in which the invention is explained in more detail with reference to a preferred embodiment represented schematically in the drawings, wherein:

FIGS. 2a–2c are views of the fastening, in the lower region of the carrier rack, to the vehicle frame;

DESCRIPTION OF THE PREFERRED EMBODIMENT

Figure 1:
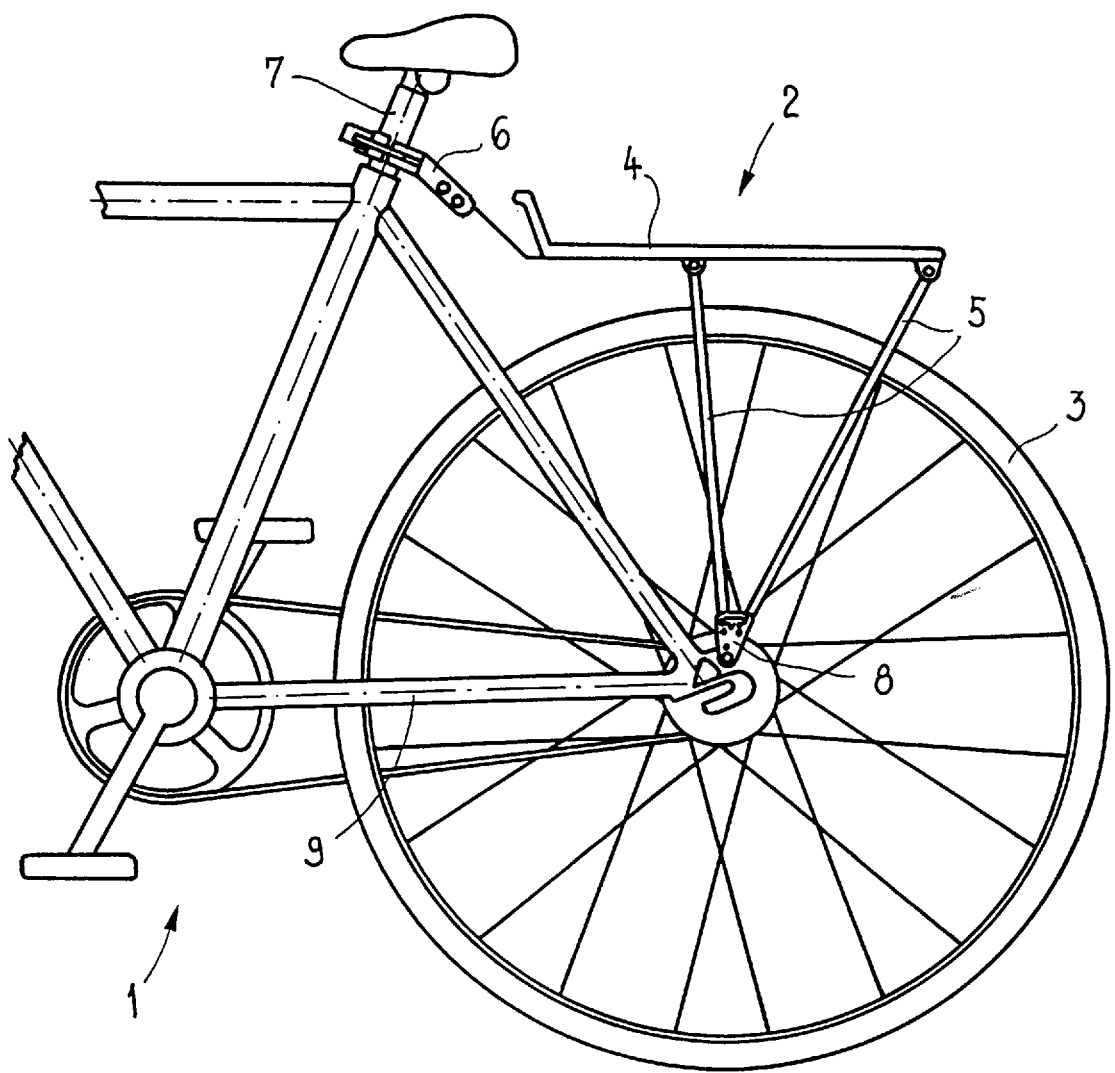
FIG. 1 is a view of a bicycle with a carrier rack.

Like reference numerals have been used in the figures for the same elements, and the first explanations of the elements apply to all the figures unless expressly stated otherwise.

Shown in FIG. 1, schematically and in a partial view, is a two-wheeled vehicle or bicycle 1 with a carrier rack 2 in the region of the rear wheel 3. The carrier rack 2 has a carrying body 4 with supporting struts 5 on both sides. The carrying body 4 is fastened on the saddle tube 7 of the bicycle 1 by an upper fastening element 6. In the region of the struts 5, the carrier rack 2 is fastened on the bicycle frame 9 by a lower fastening element 8 on each side of the rear wheel 3.

The fastening of the carrier rack 2 to the bicycle frame 9, at one side, is more clearly shown in FIG. 2a. The bicycle frame 9 usually has a threaded bore 11 in the connecting plate 12, in which a screw is normally screwed for mounting a fixedly mounted luggage rack (see also the cross-section in FIG. 2b). In the present invention, a hexagon-socket screw 13 with a sleeve-like retaining part 14 is fastened to the connecting plate 12. If there is no threaded bore 11 provided on the bicycle 1 at this location, it is possible to provide one without difficulty to screw on the retaining part 14. The retaining part 14 has radial retaining lugs 15 which fit into a circular-cylindrical opening 16 with radial cutouts 17 in the lower fastening element 8. Further, the lower fastening element 8, designed as a triangular plate, has a side part 18 which is angled off from the supporting struts 5. The side part 18 is provided with a slot 19 and an inwardly projecting anti-turning lock 20 for the engagement of a quick-action coupling means (known per se and not shown here) with corresponding hooks. As shown in FIG. 2c, the retaining lugs 15 are slightly bevelled on the sides so that they easily slide onto the lower fastening element 8 upon turning of the carrier rack 2 and can thus engage and retain the lower fastening element 8. The opening 16 in the lower fastening element 8 and the retaining part 14 connect with the retaining lugs 15 by means of a twist connection, in particular a bayonet connection, that is, when turned 90° in a clockwise direction with respect to FIG. 2a, the lower fastening element 8 is fitted onto the retaining part 14 and is secured, by the retaining part 14, against lateral release by turning slightly in the counter-clockwise direction.

Figure 3A:
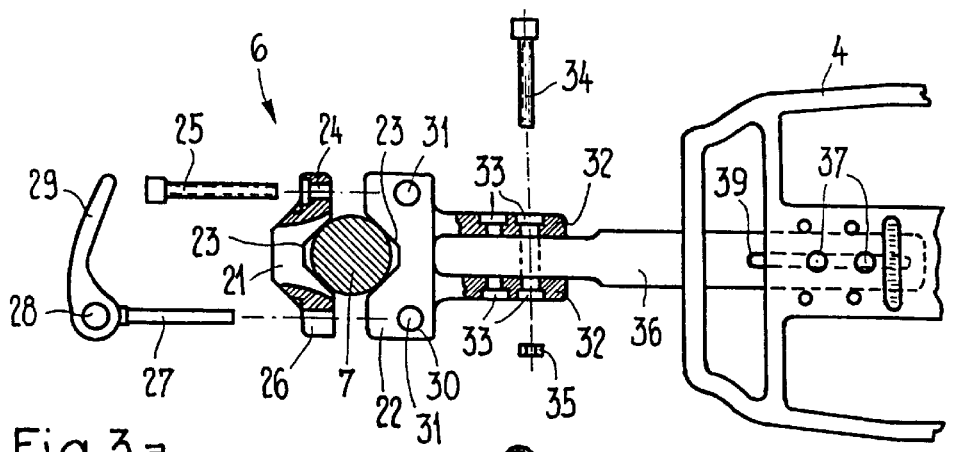
FIGS. 3a and 3b are views of the fastening, in the upper region of the carrier rack, to the saddle tube.
Figure 3B:
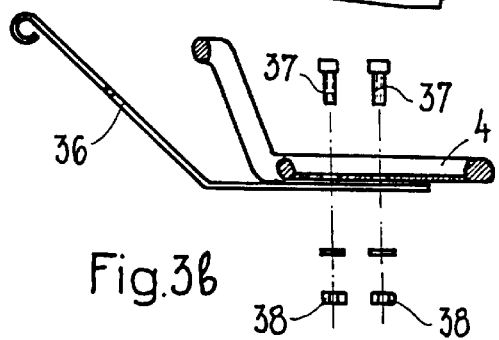

The clamping-type fastening of the upper fastening element 6 on the saddle tube 7 is shown in an exploded view in FIG. 3a. The fastening element 6 has two clamping parts 21, 22, each having a V-shaped recess 23 which engages the saddle tube 7. The clamping part 21 has a through-bore 24 for receiving the hexagon-socket screw 25 and, on the opposite side, a longitudinal groove 26 for receiving a pin 27. A cross-bolt 28 is provided on the end of the pin 27, which mounts a bracing lever 29 rotatably on the pin 27. The clamping part 22 has through-bores 30 which run approximately parallel to the saddle tube 7 and are intended for cross-bolts 31 having an interiorly threaded hole, or bore, extending perpendicular to their longitudinal axis. A threaded end of the hexagon-socket screw 25 is screwed into the hole, or bore, of one cross-bolt 31 and a threaded end of the pin 27 is screwed into the hole, or bore, of the other cross-bolt 31. Additional grooves 22a are provided on the clamping part 22 adjacent bores 30, on opposite sides (see FIGS. 4 and 5), for rotatably mounting the hexagon-socket screw 25 and the pin 27 in the clamping part 22. The clamping part 22 has two parallel angled-off fingers 32, which each have two through-bores 33 for receiving a fastening bolt 34 with a nut 35, for attachment to an angular strip 36 which is fixedly screwed, on its other end, on the carrier rack 2 by bolts 37 and nuts 38 (see FIG. 3b). As shown in FIG. 3a, the strip 36 has a longitudinal slot 39 for adjusting the spacing of the carrier rack 2 with respect to the saddle tube 7.

Figure 6A:
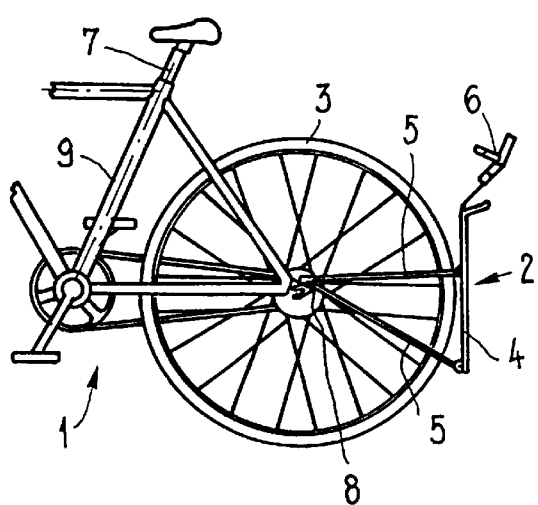
FIGS. 6a and 6b show the sequence for mounting the carrier rack.
Figure 6B:
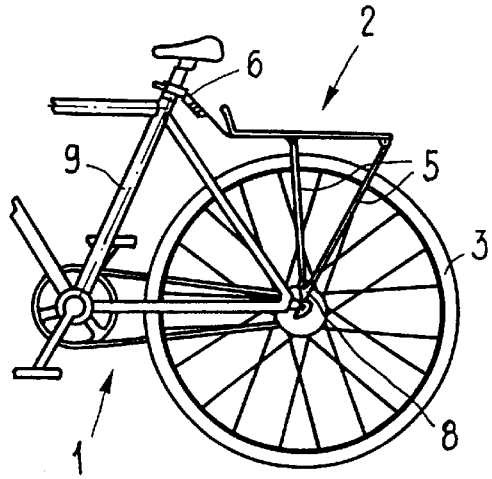
Figure 4:
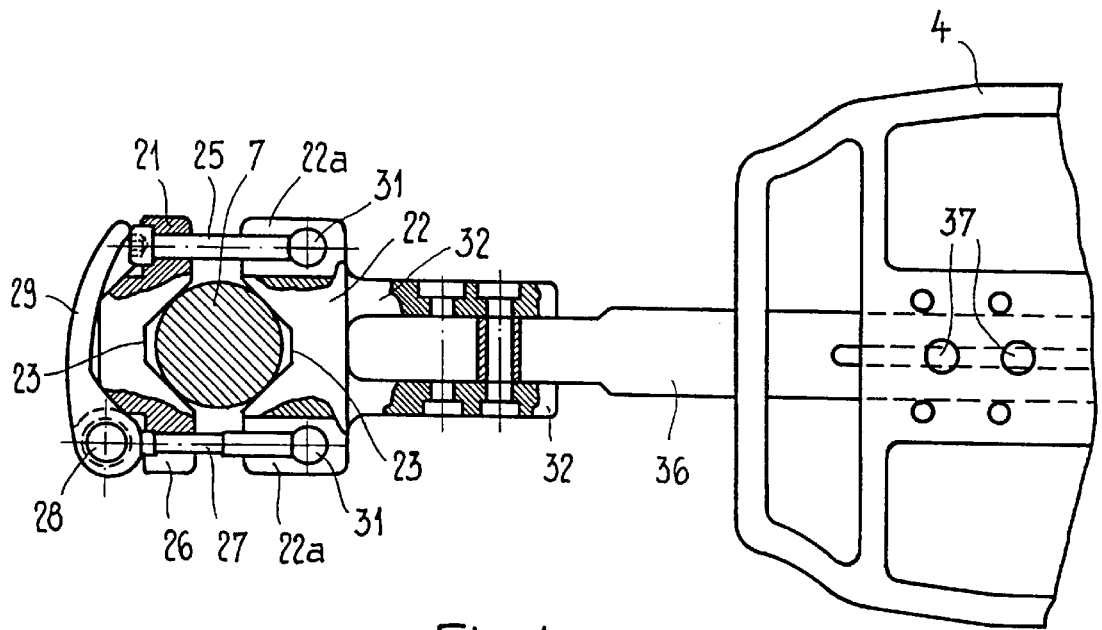
FIG. 4 is a plan view of the same fastening as in FIGS. 3a and 3b, in the clamped state.
Figure 5:
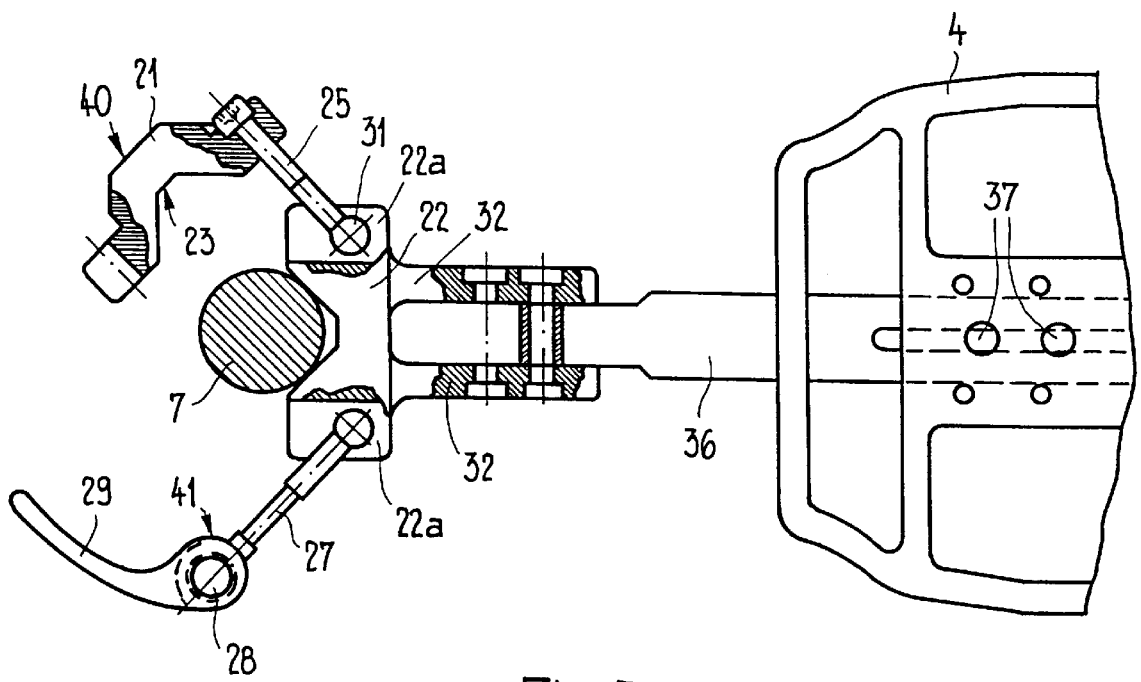
FIG. 5 is a plan view of the same fastening as in FIGS. 3a and 3b, in the open state.

FIGS. 4 and 5 show the upper fastening element 6 of FIG. 3 in the closed state and in the open state, respectively. The upper fastening element 6 functions as follows: once the carrier rack 2 has been pivoted towards the saddle tube 7 permitting the retaining lugs 15 to engage the outer surface of the lower fastening element 8 to fasten the carrier rack 2 at the bottom, the clamping part 22 rests against the saddle tube 7. The other clamping part 21 may then be placed around the saddle tube 7, so that the two clamping parts 21, 22 engage around the saddle tube 7. The pin 27 is then inserted into the longitudinal groove 26, and the bracing lever 23 is laid around the convex outer side 40 of the clamping part 21. Consequently, in a known manner, the clamping part 21 is braced against the clamping part 22 by circular-cylindrical guide 41 on the bracing lever 29, resulting in a clamping-type connection to the saddle tube 7. This manner of fastening the carrier rack 2 is likewise shown in FIGS. 6a and 6b.

The lower fastening element 8 may be designed differently to achieve the same results. In particular, the circular-cylindrical opening 16 in the lower fastening element 8 may be provided as a multiple-thread bore (not shown here) and the retaining part 14 may be provided with a corresponding multiple external thread, to achieve the above-mentioned twist connection with a screw connection requiring not more than a half-turn. A quarter-turn should usually be sufficient for such a fastening method. Further, it is not absolutely necessary for the carrier rack 2 to be turned with respect to the retaining part 14, but rather, the retaining part 14 may be fastened rotatably on the bicycle frame 9, the retaining lugs 15 of the retaining part 14 being larger so that the retaining part can be gripped between the index finger and the thumb and turned.

Furthermore, the upper fastening element 6 may also be designed differently, to produce the necessary clamping-type connection to the saddle tube 7. For example, rather than having a bracing lever 29, the pin 27 may be designed with a widened bead which engages a circular-cylindrical annular groove in the clamping part 21, allowing the pin to be mounted in the clamping part 22, by a spring element, such that it can be moved elastically in its longitudinal direction. However, the design including the bracing lever 29 is particularly advantageous since an extremely rapid and reliable clamping-type fastening is achieved. Also, fastening is adjustable in terms of clamping force on account of the screw connection of the pin 27 and the cross-bolt 31.

What is claimed is:

1. A carrier rack for a two-wheeled vehicle, in particular for a bicycle, comprising:

a carrying body;

struts supporting the carrying body;

lower fastening elements mounted on the struts; and an upper fastening element mounted on the carrying body for fastening the carrier rack on the vehicle, wherein each of the lower fastening elements is fitted onto a retaining part, which is fastenable on the vehicle, and is brought into operative connection with the retaining part, and released therefrom, by turning the carrier rack with respect to the retaining part, wherein the upper fastening element is a clamping-type closure which can be manually clamped on, and released from, a tube of the two-wheeled vehicle, wherein the lower fastening element and the retaining part are connected to one another by a twist connection, in particular a bayonet connection, and wherein the retaining part is a circular cylinder with two radially projecting retaining lugs, and the lower fastening element has a circular-cylindrical opening with radial cutouts for receiving to the retaining lugs.

2. The carrier rack according to claim 1, wherein the clamping-type closure has two clamping parts which engage around the tube of the two-wheeled vehicle and, on one side, are connected pivotally to one another and, on an opposite side, are brought into clamping connection with one another, and released from one another, by a bracing element.

3. The carrier rack according to claim 2, wherein the bracing element comprises a pin, which, at one end, is mounted pivotally in one of the two clamping parts and which, at the other end, bears a bracing lever rotatably mounted thereto and a longitudinal groove, which receives the pin laterally and is located in the other of the two clamping parts, the bracing lever, in the mounted state, bracing the clamping parts against the vehicle tube and at least partially engaging around the other of the two clamping parts.

4. The carrier rack according to claim 1, wherein the upper fastening element is mounted on the carrying body such that it can be displaced in a longitudinal direction thereof.

5. A carrier rack for a two-wheeled vehicle, in particular for a bicycle, comprising:

a carrying body;

struts supporting the carrying body;

lower fastening elements mounted on the struts; and an upper fastening element mounted on the carrying body for fastening the carrier rack on the vehicle, wherein each of the lower fastening elements is fitted onto a retaining part, which is fastenable on the vehicle, and is brought into operative connection with the retaining part, and released therefrom, by turning the carrier rack with respect to the retaining part, wherein the upper fastening element is a clamping-type closure which can be manually clamped on, and released from, a tube of the two-wheeled vehicle, wherein the lower fastening element and the retaining part are connected to one another by a twist connection, in particular a bayonet connection, wherein the lower fastening element and the retaining part are connected to one another by a screw connection requiring a half-turn or less, and wherein the retaining part is a circular cylinder with a multiple screw thread, and the lower fastening element has a circular opening with a mating multiple screw thread.

6. The carrier rack according to claim 5, wherein the clamping-type closure has two clamping parts which engage around the tube of the two-wheeled vehicle and, on one side, are connected pivotally to one another and, on an opposite side, are brought into clamping connection with one another, and released from one another, by a bracing element.

7. The carrier rack according to claim 6, wherein the bracing element comprises a pin, which, at one end, is mounted pivotally in one of the two clamping parts and which, at the other, end, bears a bracing lever rotatably mounted thereto and a longitudinal groove, which receives the pin laterally and is located in the other of the two clamping parts, the bracing lever, in the mounted state, bracing the clamping parts against the vehicle tube and at least partially engaging around the other of the two clamping parts.

8. The carrier rack according to claim 5, wherein the upper fastening element is mounted on the carrying body such that is can be displaced in a longitudinal direction thereof.

9. A carrier rack for a two-wheeled vehicle comprising:
  body means for supporting items to be carried by the carrier rack;
  struts means for supporting the body means;
  lower fastening means for fastening the carrier rack to the vehicle in the vicinity of a rear wheel of the vehicle, the lower fastening means being fitted onto a retaining part which is fastened to the vehicle, and being brought into locking engagement with the retaining part by turning the carrier rack with respect to the retaining part; and
  upper fastening means for fastening the carrier rack to the vehicle in the vicinity of a tube of the vehicle, the upper fastening means being manually clamped onto, and released from, the tube of the vehicle, wherein the lower fastening means twists onto the retaining part, and wherein the retaining part is a circular cylinder with two radially projecting lugs, and the lower fastening means has a circular-cylinder opening with radial cutouts for receiving the retaining lugs.

10. The carrier rack according to claim 9, wherein the upper fastening means comprises a pair of clamps which engage around the tube of the vehicle, the pair of clamps being pivotally connected on one side of the tube and being brought into clamping engagement on an opposite side of the tube, and released therefrom, by a brace.

11. The carrier rack according to claim 10, wherein the brace comprises a pin, which, at one end, is mounted pivotally in one of the pair of clamps and, which, at another end, bears a bracing lever rotatably mounted thereto and a longitudinal groove, which receives the pin laterally and is located in the other of the pair of clamps, the bracing lever, in the mounted state, bracing the pair of clamps against the vehicle tube and at least partially engaging around the other of the pair of clamps.

12. The carrier rack according to claim 9, wherein the upper fastening means is mounted on the body means such that it can be displaced in a longitudinal direction thereof.

13. A carrier rack for a two-wheeled vehicle comprising:
  body means for supporting items to be carried by the carrier rack;
  struts means for supporting the body means;
  lower fastening means for fastening the carrier rack to the vehicle in the vicinity of a rear wheel of the vehicle, the lower fastening means being fitted onto a retaining part which is fastened to the vehicle, and being brought into locking engagement with the retaining part by turning the carrier rack with respect to the retaining part; and
  upper fastening means for fastening the carrier rack to the vehicle in the vicinity of a tube of the vehicle, the upper fastening means being manually clamped onto, and released from, the tube of the vehicle, wherein the lower fastening means twists onto the retaining part, wherein the lower fastening means screws onto the retaining part, locking engagement requiring a half turn or less, and wherein the retaining part is a circular cylinder with a multiple screw thread, and the lower fastening means has a circular opening with a mating multiple screw thread.

14. The carrier rack according to claim 13, wherein the upper fastening means comprises a pair of clamps which engage around the tube of the vehicle, the pair of clamps being pivotally connected on one side of the tube and being brought into clamping engagement on an opposite side of the tube, and released therefrom, by a brace.

15. The carrier rack according to claim 14, wherein the brace comprises a pin, which, at one end, is mounted pivotally in one of the pair of clamps and, which, at another end bears a bracing lever rotatably mounted thereto and a longitudinal groove, which receives the pin laterally and is located in the other of the pair of clamps, the bracing lever, in the mounted state, bracing the pair of clamps against the vehicle tube and at least partially engaging around the other of the pair of clamps.

16. The carrier rack according to claim 13, wherein the upper fastening means is mounted on the body means such that it can be displaced in a longitudinal direction thereof.

\* \* \* \* \*